Oct. 11, 1949.                T. A. RICH                2,484,587
                              FLUXMETER
                          Filed Sept. 4, 1948
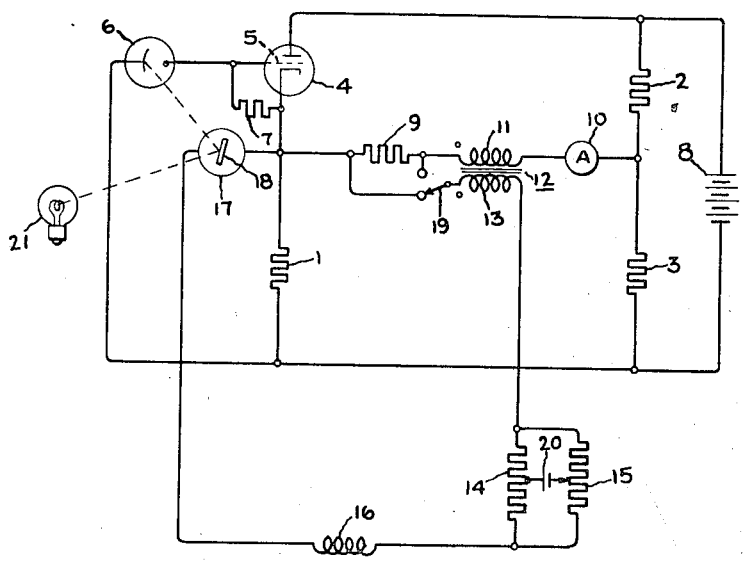
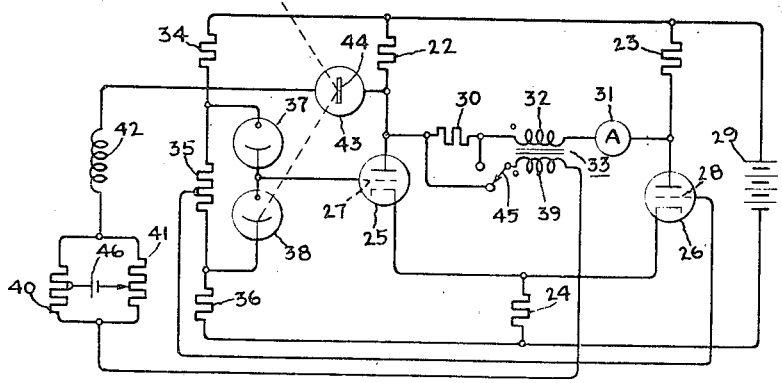
Inventor:
Theodore A. Rich,
by Richard E. Hosley
        His Attorney.

Patented Oct. 11, 1949

2,484,587

UNITED STATES PATENT OFFICE 2,484,587

FLUXMETER

Theodore A. Rich, Schenectady, N. Y., assignor to General Electric Company, a corporation of Delaware Application September 4, 1948, Serial No. 47,853

8 Claims. (Cl. 175—183)

1

This invention relates to fluxmeters and its principal object is to provide an improved high sensitivity fluxmeter with a zero return. Other objects and advantages will become apparent as the description proceeds.

The features of the invention which are believed to be novel and patentable are pointed out in the claims forming a part of this specification. For a better understanding of the invention, reference is made in the following description to the accompanying drawing in which Figs. 1 and 2 respectively are circuit diagrams of two preferred embodiments of the invention. Dots placed alongside the mutual inductor windings indicate points of like polarity.

Referring now to Fig. 1, resistors 1, 2, and 3 and vacuum tube 4 constitute a four-cornered bridge circuit. Resistors 1, 2, and 3 are three fixed resistance arms of the bridge, and vacuum tube 4 is a variable resistance arm. The resistance of vacuum tube 4 varies responsive to changes in potential of its control electrode 5. Phototube 6 and resistor 7 in series are connected between the cathode of tube 4 and the lower corner of the bridge with their circuit junction connected to electrode 5, as shown, so that a potential is provided at electrode 5 which decreases responsive to increased illumination of phototube 6.

A battery 8, or other source of unidirectional voltage, is connected across two corners of the bridge circuit to provide an energizing voltage. A resistor 9, an ammeter 10, and the primary 11 of a mutual inductor or transformer 12 are connected across the other two corners, or output, of the bridge circuit.

A circuit loop comprising the secondary 13 of mutual inductor 12, resistors 14 and 15 in parallel, a search coil 16, and a mirror galvanometer 17 having a mirror 18, is provided as shown. Switching means 19 is provided to selectively include or not include resistor 9 in this circuit loop.

A battery 20 is connected as shown between a tap on resistor 14 and an adjustable tap on resistor 15 to provide a small adjustable voltage in the loop for purposes hereinafter described. A light source 21, which may be a small electric lamp, transmits a beam of light to mirror 18, from which the beam is reflected to phototube 6. Lamp 21 thus illuminates phototube 6 by an amount which depends upon the position of mirror 18.

Preferably, galvanometer 17 is magnetically torque compensated, that is, a small permanent magnet is attached to the moving element of the galvanometer in such a way that the torque inherent in the galvanometer suspension is substantially neutralized. A galvanometer of this type is described in my Patent No. 2,326,252, issued August 10, 1943 and assigned to the same assignee as this application. Such a galvanometer has the characteristic that its moving element, to which the mirror 18 is attached, rotates responsive to very feeble currents, tends to continue rotating within limits as long as any current is applied, and tends to remain in position when the current is stopped or interrupted. Mirror 18 rotates clockwise when current flows from right to left through galvanometer 17.

The operation of the fluxmeter illustrated is as follows: Initially, the bridge circuit is balanced; that is, the resistance of vacuum tube 4 is to the resistance of resistor 1 as the resistance of resistor 2 is to the resistance of resistor 3. This value of resistance for vacuum tube 4 is obtained by a potential at control electrode 5 responsive to a degree of illumination of phototube 6 corresponding to one position of mirror 18. The balancing position of mirror 18 is automatically obtained in the manner hereinafter described.

When the bridge is balanced no current flows through resistor 9, ammeter 10, or primary 11, and the indication of ammeter 10 is "zero." Switch 19 is placed in its lower position, as shown in the drawing. Search coil 16 is now moved into the magnetic field which is to be measured. As coil 16 is moved into the field, the lines of magnetic flux cut the conductors of the coil and induce voltages therein. The induced voltages have a magnitude proportional to the product of magnetic field strength and the speed with which coil 16 is moved into the field. The time integral of voltage induced in coil 16 during its movement into the field is proportional to field strength alone.

Suppose that the voltage so induced has a positive polarity at the right-hand side of the coil. This tends to produce a current from right to left through galvanometer 17, which causes mirror 18 to begin to rotate clockwise. Such rotation, however, increases the illumination of phototube 6, which lowers the potential of control electrode 5 and causes tube 4 to conduct less current, thus increasing its resistance. This unbalances the bridge, and causes current to flow from right to left through resistor 9, ammeter 10, and primary 11. A voltage is induced in secondary 13 which is proportional to the rate of change of current in primary 11 times the mutual inductance of inductor 12, and which has a polarity to buck out the voltage in search coil 16.

Since an extremely small rotation of mirror 18 suffices to buck out any voltages induced in the search coil, the current through ammeter 10 changes at a rate proportional to the voltage bucked out. Consequently, the change in the indication of ammeter 10 during any time interval is proportional to the integral of volt-seconds produced in coil 16, and hence to the net change during such interval in the number of lines of magnetic flux linked by the coil. Thus, if the indication of ammeter 10 is "zero" at a reference position of coil 16, at any other position of the search coil the indication of ammeter 10 is proportional to the difference between the respective magnetic field strengths at the measured position and at the reference position.

When it is desired to return the bridge to balance so that ammeter 10 will again read zero, switch 19 is moved to its upper position so that resistor 9 is included in the circuit loop in series with galvanometer 17. As long as current flows through resistor 9, there is a voltage drop across the resistor which causes current flow through galvanometer 17, which rotates mirror 18. Suppose that current flow through resistor 9 is from right to left, as was previously assumed; the resulting current flow through galvanometer 17 is from left to right, which causes mirror 18 to rotate counterclockwise. This reduces the illumination of phototube 6, increases the potential of control electrode 5, and decreases the resistance of vacuum tube 4 until the bridge circuit is returned to balance. When the bridge circuit is balanced, no further current flows through resistor 9 and rotation of mirror 18 stops. Switch 19 may be left in its upper position to maintain the bridge in balance until it is desired to make another flux reading.

If the change in magnetic flux linkages through coil 16 were such that the voltages induced in the search coil had a negative polarity at the right-hand side of the coil, the operation of the circuit would be as described, except that the currents would all flow in the opposite directions and mirror 18 would initially rotate counterclockwise instead of clockwise.

The change in current through ammeter 10 in abamperes multiplied by the mutual inductance of inductor 12 in abhenries is equal to the change in flux linkages of coil 16. By selecting the proper value of such mutual inductance for a given range of magnetic field strengths to be measured, the currents through ammeter 10 can be made large enough to drive a recording instrument, so that ammeter 10 can be either an indicating or recording instrument as desired. Means may be provided to selectively switch a plurality of inductors 12 having different mutual inductances into the circuit, so that a single ammeter can be used to cover several different ranges of magnetic field strengths.

Due to the high sensitivity of the circuit described, "drift" due to small, spurious thermal voltages in the measurement circuit loop may be appreciable unless some compensating means is employed. These thermal voltages are the result of thermoelectric potentials generated by temperature differences at various wiring junctions; for example, the junctions of lead wires with the galvanometer elements and the junctions of lead wires with the search coil; or even within a continuous wire due to impurities. The spurious thermal voltages can be bucked out by a small voltage provided by battery 20 across resistors 14 and 15. The proper value of this compensating voltage is obtained by adjusting the tap position on resistor 15 until substantially no "drift" or change in the indication of ammeter 10 occurs while search coil 16 experiences no change of flux linkages.

Refer now to Fig. 2, which shows another form of the invention. In this embodiment, a four-cornered bridge circuit comprises resistors 22, 23 and 24 and vacuum tubes 25 and 26. Vacuum tubes 25 and 26 may be separate tubes or may be two sections of a multi-section tube such as a dual triode. The vacuum tubes have respective control electrodes 27 and 28. The bridge circuit is energized by battery 29, or other source of preferably unidirectional voltage, connected between the corner of the bridge circuit adjacent the two arms containing vacuum tubes and the opposite corner of the bridge circuit. A resistor 30, an ammeter 31, and the primary 32 of a mutual inductor 33 are connected across the other two corners or output of the bridge circuit.

The potential of control electrode 28 is maintained constant by a potential divider comprising resistors 34, 35 and 36. Thus, vacuum tube 26 is a fixed impedance element in the bridge circuit. The potential of control electrode 27 depends upon the relative amounts of illumination of phototubes 37 and 38. Thus, vacuum tube 25 is a variable impedance element. This arrangement is relatively insensitive to line voltage variations since substantially equal changes take place in both tubes.

The measurement circuit loop comprises secondary 39 of mutual inductor 33, resistors 40 and 41 in parallel, search coil 42, and mirror galvanometer 43 having a rotatable mirror 44. Mirror 44 rotates clockwise responsive to current flowing from right to left through galvanometer 43. Switching means 45 is provided to selectively include or not include resistor 30 in the circuit loop. Battery 46 connected between a tap on resistor 40 and an adjustable tap on resistor 41 provides means to compensate for spurious thermal voltages, and electric lamp 47 provides means to illuminate photocells 37 and 38 by different relative amounts depending upon the position of mirror 44.

When mirror 44 rotates clockwise, the illumination of photocell 37 is increased and the illumination of photocell 38 is decreased. This raises the potential of electrode 27, decreases the resistance of vacuum tube 25, and causes an increase of current flow from right to left through resistor 30, ammeter 31, and primary 32. Rotation of mirror 44 counterclockwise causes an increase of current flow from left to right through resistor 30, ammeter 31, and primary 32. Otherwise, the operation of the circuit of Fig. 2 is substantially the same as that of the circuit of Fig. 1.

Having described the principle of this invention and the best mode in which I have contemplated applying that principle, I wish it to be understood that the apparatus described is illustrative only, and that other means can be employed without departing from the true scope of the invention defined by the following claims.

What I claim as new and desire to secure by Letters Patent of the United States is:

1. A fluxmeter comprising a bridge circuit including as a variable impedance in one of its arms a vacuum tube having a control electrode, means to apply energizing voltage to said bridge circuit, means including a phototube to vary the potential of said control electrode responsive to changes in illumination of such phototube, a mutual inductor having a primary and a secondary, an ammeter and a resistor connected in series with the mutual inductor primary across the output of said bridge circuit, a circuit loop including a galvanometer, a search coil, and the secondary of said mutual inductor connected in series, switching means to selectively include or not include said resistor in said circuit loop, and means to illuminate said photocell by an amount which varies with the position of the moving element of said galvanometer.

2. A fluxmeter as in claim 1 in which the galvanometer is torque compensated.

3. A fluxmeter as in claim 1 including an adjustable source of voltage in the circuit loop to compensate for spurious thermal voltages.

4. A fluxmeter comprising a bridge circuit having three fixed impedance arms and a variable impedance arm including as the variable impedance a vacuum tube having a control electrode, means to apply unidirectional energizing voltage to said bridge circuit, means including a phototube to vary the potential of said control electrode responsive to changes in illumination of such phototube, a mutual inductor having a primary and a secondary, an ammeter and a resistor connected in series with the mutual inductor primary across the output of said bridge circuit, a circuit loop including a mirror galvanometer, a search coil, and the secondary of said mutual inductor connected in series, switching means to selectively include or not include said resistor in said circuit loop, and a light source positioned to illuminate said photocell by an amount which varies with the mirror position of said galvanometer.

5. A fluxmeter as in claim 4 in which the galvanometer is magnetically torque compensated.

6. A fluxmeter comprising a four-cornered bridge circuit having three fixed resistance arms and a variable resistance arm including as the variable resistance a vacuum tube having a control electrode, means including a phototube connected to decrease the potential of said control electrode responsive to increased illumination of the phototube thereby increasing the resistance of said vacuum tube, means to apply unidirectional energizing voltage across two opposite corners of said bridge circuit, a mutual inductor having a primary and a secondary, an ammeter and a resistor connected in series with the mutual inductor primary across the other two corners of said bridge circuit, a circuit loop including a magnetically torque-compensated mirror galvanometer, a search coil, and the secondary of said mutual inductor connected in series, switching means to selectively include or not include said resistor in said circuit loop, an adjustable source of voltage in said circuit loop to compensate for spurious thermal voltages, and a light source positioned to illuminate said photocell by an amount which varies with the mirror position of said galvanometer.

7. A fluxmeter comprising a four-cornered bridge circuit having three fixed resistance arms and a variable resistance arm, said variable resistance arm including as a variable resistance a first vacuum tube having a control electrode, one of said fixed resistance arms adjacent the variable resistance arm including a second vacuum tube having a control electrode, means to apply unidirectional energizing voltage between the corner of said bridge circuit adjacent the two arms containing vacuum tubes and the opposite corner of the bridge circuit, a mutual inductor having a primary and a secondary, an ammeter and a resistor connected in series with the mutual inductor primary across the other two corners of said bridge circuit, voltage divider means including at least one phototube connected to decrease the control electrode potential of said first vacuum tube responsive to increased illumination of the phototube, voltage divider means to maintain constant the control electrode potential of said second vacuum tube, a circuit loop including a magnetically torque-compensated mirror galvanometer, a search coil, and the secondary of said mutual inductor connected in series, switching means to selectively include or not include said resistor in said circuit loop, an adjustable source of voltage in said circuit loop to compensate for spurious thermal voltages, and a light source positioned to illuminate said photocell by an amount which varies with the mirror position of said galvanometer.

8. In a fluxmeter comprising a first circuit branch including a mutual inductor, a closed circuit loop including a search coil, a mirror galvanometer, and said mutual inductor in series, photoelectric control means to maintain substantially zero current through said galvanometer by providing direct current through said first circuit branch and varying the value of such direct current in response to mirror movements of said galvanometer, whereby a voltage is produced across said mutual inductor to buck out any voltage induced in said search coil, and an instrument connected to be responsive to the value of direct current in said first circuit branch, the improvement which comprises a resistor connected in series with said mutual inductor in said first circuit branch, and switching means to include or not include, selectively, said resistor in said closed circuit loop, whereby said instrument may be returned to zero indication by switching said resistor into said closed circuit loop.

THEODORE A. RICH.

REFERENCES CITED

The following references are of record in the file of this patent:

UNITED STATES PATENTS

| Number | Name | Date |
| --- | --- | --- |
| 2,054,672 | Edgar | Sept. 15, 1936 |
| 2,367,614 | Rich | Jan. 16, 1945 |

Certificate of Correction

Patent No. 2,484,587                                                         October 11, 1949

THEODORE A. RICH

It is hereby certified that errors appear in the above numbered patent requiring correction as follows:

In the grant, line 3, and in the heading to the printed specification, line 5, State of incorporation, for "Delaware" read *New York*;

and that the said Letters Patent should be read with these corrections therein that the same may conform to the record of the case in the Patent Office.

Signed and sealed this 21st day of March, A. D. 1950.

[SEAL]

THOMAS F. MURPHY,
*Assistant Commissioner of Patents.*